United States Patent
Dzung

(10) Patent No.: US 7,752,430 B2
(45) Date of Patent: Jul. 6, 2010

(54) DATA ENCRYPTION ON THE PHYSICAL LAYER OF A DATA TRANSMISSION SYSTEM

(75) Inventor: Dacfey Dzung, Wettingen (CH)

(73) Assignee: ABB Research Ltd, Zurich (CH)

(*) Notice: Subject to any disclaimer, the term of this patent is extended or adjusted under 35 U.S.C. 154(b) by 1293 days.

(21) Appl. No.: 10/928,135

(22) Filed: Aug. 30, 2004

(65) Prior Publication Data
US 2005/0055546 A1     Mar. 10, 2005

(30) Foreign Application Priority Data
Sep. 8, 2003     (EP)     ................... 03405655

(51) Int. Cl.
*H04L 29/06*     (2006.01)
(52) U.S. Cl. .................................................. 713/151
(58) Field of Classification Search ................. 713/151
See application file for complete search history.

(56) References Cited

U.S. PATENT DOCUMENTS

| | | | | |
|---|---|---|---|---|
| 4,458,355 A | * | 7/1984 | Motley et al. | 375/327 |
| 4,924,516 A | * | 5/1990 | Bremer et al. | 380/46 |
| 5,235,645 A | * | 8/1993 | Stocker | 380/268 |
| 5,341,425 A | * | 8/1994 | Wasilewski et al. | 380/212 |
| 5,351,134 A | * | 9/1994 | Yaguchi et al. | 358/435 |
| 5,608,764 A | * | 3/1997 | Sugita et al. | 375/344 |
| 5,703,952 A | * | 12/1997 | Taylor | 380/44 |
| 5,748,677 A | * | 5/1998 | Kumar | 375/285 |
| 5,825,807 A | * | 10/1998 | Kumar | 375/130 |
| 5,854,840 A | * | 12/1998 | Cannella, Jr. | 380/268 |
| 6,028,933 A | * | 2/2000 | Heer et al. | 713/169 |
| 6,035,040 A | * | 3/2000 | Mann et al. | 380/28 |
| 6,118,976 A | * | 9/2000 | Arias et al. | 725/118 |
| 6,157,679 A | * | 12/2000 | Johnson | 375/281 |
| 6,349,138 B1 | * | 2/2002 | Doshi et al. | 380/200 |
| 6,359,938 B1 | * | 3/2002 | Keevill et al. | 375/316 |
| 6,438,367 B1 | * | 8/2002 | Crawford | 455/410 |
| 6,516,065 B1 | * | 2/2003 | Joshi et al. | 380/270 |
| 6,611,513 B1 | * | 8/2003 | ten Brink | 370/342 |
| 6,973,141 B1 | * | 12/2005 | Isaksen et al. | 375/308 |
| 6,980,649 B1 | * | 12/2005 | Batcher | 380/42 |
| 6,996,129 B2 | * | 2/2006 | Krause et al. | 370/487 |
| 7,095,856 B2 | * | 8/2006 | Logalbo et al. | 380/274 |
| 7,130,427 B2 | * | 10/2006 | Silverman et al. | 380/277 |

(Continued)

FOREIGN PATENT DOCUMENTS

WO     WO 01/47167 A1     6/2001

*Primary Examiner*—Edan Orgad
*Assistant Examiner*—James Turchen
(74) *Attorney, Agent, or Firm*—Buchanan Ingersoll & Rooney PC

(57) ABSTRACT

The present invention is concerned with a method to encrypt OFDM modulation, by multiplying its underlying QAM symbols by a complex-valued generalized key stream sequence. Performing encryption on the physical layer ensures that all services and applications running over the OFDM modem will be protected against eavesdropping. It is also proposed to include in the encryption any training symbols used for synchronization and channel estimation. Only the legitimate receiver knowing the encryption key is hence able to synchronize and correctly demodulate the received signal. Attackers will not even be able to acquire the encrypted signal.

11 Claims, 1 Drawing Sheet

U.S. PATENT DOCUMENTS

| | | | |
|---|---|---|---|
| 7,269,403 B1 * | 9/2007 | Miao | 455/402 |
| 7,324,600 B2 * | 1/2008 | Pauli et al. | 375/260 |
| 7,564,908 B2 * | 7/2009 | Luz et al. | 375/260 |
| 2002/0122465 A1 * | 9/2002 | Agee et al. | 375/141 |
| 2003/0095662 A1 * | 5/2003 | Jarosinski et al. | 380/268 |
| 2004/0081131 A1 * | 4/2004 | Walton et al. | 370/344 |

* cited by examiner

DATA ENCRYPTION ON THE PHYSICAL LAYER OF A DATA TRANSMISSION SYSTEM

FIELD OF THE INVENTION

The invention relates to encryption techniques for data transmission. It departs from a method of encrypting data on the physical layer of a data transmission system as described in the preamble of claim 1.

BACKGROUND OF THE INVENTION

Signals from wireless data transmission in general as well as signals from powerline communication are easily intercepted by appropriate receivers, necessitating encryption techniques in order to provide for some level of confidentiality. Digital encryption is usually applied to the transmitted bits at the link layer or at higher protocol layers of the communication protocol stack. Block encryption techniques permute blocks of bits in a key-dependent way, while stream ciphers first generate a key-dependent pseudo-random binary key stream, which is then XOR-ed with the plaintext bit sequence to produce the cipher text. A separate key management procedure ensures that sender and legitimate receiver both know the secret key and can thus establish a confidential data transmission path. An eavesdropper without access to the key cannot easily recover the plaintext from an intercepted cipher text.

Performing encryption on a certain higher protocol layer makes it application- or service-specific. Other services running on top of unencrypted lower protocol layers remain unprotected or must implement their own encryption. Further, some data bits e.g. for synchronization, addressing, and other control functions may remain unencrypted. Eavesdroppers using so-called "sniffers" are thus able to synchronize to intercepted data packets, read control information, and obtain the binary cipher text, which can then be crypto-analyzed separately.

Performing encryption on the lowest protocol layer of the information transfer process, i.e. the physical communication layer or modem layer where the digital modulation occurs, overcomes the disadvantages mentioned above. The U.S. Pat. No. 6,157,679 describes a method to encrypt radio frequency (RF) single carrier $2^4$-QAM signals by transmitting altered QAM constellation symbols directly and sequentially. The alteration is based on a binary key stream and involves a complex conjugation of QAM symbols, i.e. flipping the sign of their components. This sign change is easy to implement as it involves no computation. However, as with all time-domain QAM, intersymbol interference of the QAM symbols introduces complications for synchronization and channel equalization for the intended receiver, even without encryption of the QAM symbols.

DESCRIPTION OF THE INVENTION

It is therefore an objective of the invention to provide for a data encryption technique which prevents eavesdroppers from synchronizing to intercepted data packets and at the same time facilitates channel equalization by the intended receiver. These objectives are achieved by a method of encrypting and decrypting data according to the claims 1 and 8, and by a modem for encrypting and decrypting data according to claims 9 and 10. Further preferred embodiments are evident from the dependent patent claims.

In the inventive encryption technique, an encryption on the physical communication layer is combined with Orthogonal Frequency Division Multiplex (OFDM) transmission schemes. OFDM is a digital modulation technique particularly adapted to transmission channels or bands with frequency-dependent characteristics (e.g. signal-to-noise) such as wireless or powerline transmission. In contrast to single carrier QAM, OFDM modulation involves a superposition of several sub-channels or sub-carriers, wherein inter-sub-carrier interference is avoided and sub-carrier-equalization is facilitated by a cyclic prefix.

In other words, the invention introduces encryption on the physical protocol layer, i.e. directly on the digital modulation level of the OFDM modulation scheme. OFDM symbols to be transmitted comprise several underlying Quadrature Amplitude Modulated (QAM) symbols which are altered in a manner determined by an encryption key. Specifically, the concept of stream ciphers is modified in that a generalized key stream sequence is concatenated with the sequences of said underlying QAM symbols. The generation of the key stream sequence takes advantage of known methods to generate cryptographically secure binary key streams. The actual encryption is easy to implement.

In a preferred variant of the invention, said key stream sequence consists of elements chosen at random from a set of K>2 distinct values. This allows more varied alterations of the underlying QAM symbols that just a change in sign or a complex conjugation, further obstructing signal acquisition attempts by an eavesdropper.

In a further preferred embodiment of the invention, the encryption operation consists of a simple complex multiplication with the elements of the key stream sequence, which can be efficiently performed by the digital signal processors typically used for the implementation of OFDM modems. (Traditional binary encryption schemes require bit-wise manipulations which cannot be performed efficiently on such processors). If the elements of the key stream sequence are of equal amplitude, the amplitude of the QAM symbols and therefore the transmitted power of the corresponding sub-channels are left unchanged.

In the case of an underlying $2^m$ QAM modulation involving $2^m$ constellation points (or potential QAM symbols), the latter are symmetrically distributed in the four quadrants of the complex plane. If the operation then equals a congruent rotation, every altered symbol again is a regular constellation point. The number K of distinct complex elements of the key stream sequence is therefore preferably set to 4 and the elements themselves are multiples of $\pi/2$. Another possible QAM constellation consists of 16 equally spaced points on a circle, i.e. a pure phase modulation. Here K=16 (roots of unity) also preserves the original constellation points.

In an alternative preferred embodiment of the invention, the encryption operation consist in a pseudo-random permutation of the constellation points, i.e. the QAM symbols are exchanged by other QAM symbols. In order not to upset power allocation to the sub-channels, the permutation preferably takes place among subsets of constellation points with equal amplitude.

In another preferred variant, training OFDM symbols are periodically inserted, encrypted and transmitted just as ordinary data OFDM symbols. At the receiver, the received training OFDM symbols are evaluated in order to facilitate synchronization and channel estimation.

BRIEF DESCRIPTION OF THE DRAWINGS

The subject matter of the invention will be explained in more detail in the following text with reference to preferred exemplary embodiments which are illustrated in the attached drawings, in which.

The reference symbols used in the drawings, and their meanings, are listed in summary form in the list of reference symbols. In principle, identical parts are provided with the same reference symbols in the figures.

DETAILED DESCRIPTION OF PREFERRED EMBODIMENTS

Figure 1:
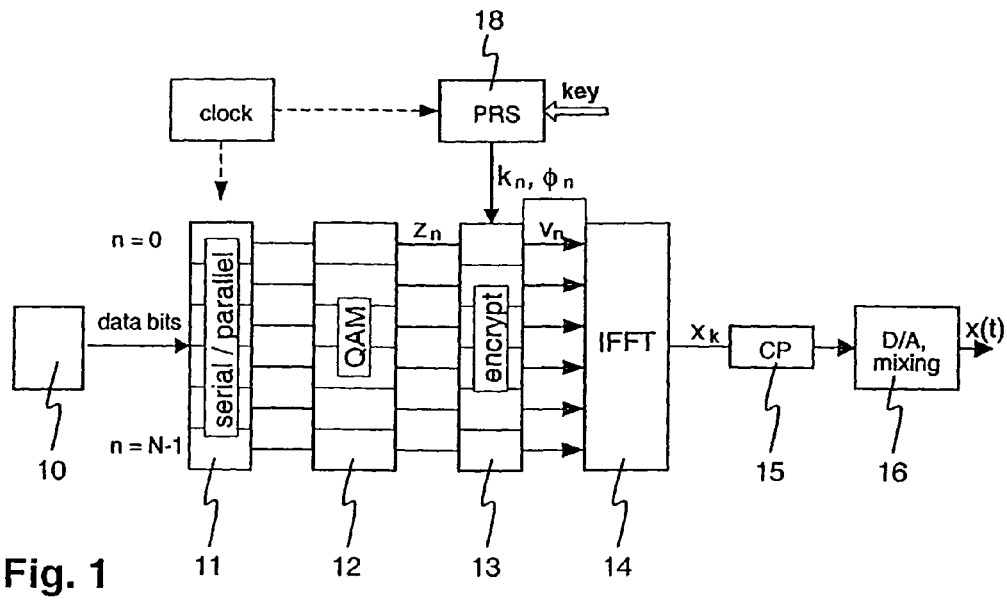
FIG. 1 schematically shows a transmitter block diagram.

FIG. 1 shows a transmitter block diagram for constructing an encrypted OFDM symbol with N sub-carriers according to the invention. The data bits comprising physical layer bits for synchronization and channel estimation in addition to higher layer bits, are prepared in packets at the data source 10 and enter serially into and are divided in data block of $m_n$ bits (n=0 . . N−1) by an OFDM vectorizer 11. These blocks are processed in parallel in a QAM mapper 12, each block being assigned a complex number $z_n$, i.e. being mapped to a QAM symbol or constellation point according to the $2^m$-QAM scheme and possibly scaled by a gain $g_n$. The number $m_n$ of bits and the gain $g_n$ may depend on the sub-carrier index n, if some optimized frequency-dependent bit loading and gain allocation schemes are used.

In the following encryption step, the sequence of complex numbers $z_n$ is operated on in an encryptor 13 by multiplying with a generalized complex-valued key stream sequence $\{k_n\}$ and a cipher text sequence $v_n$ is obtained, i.e.

$$v_n = k_n \cdot z_n$$

The generation of $\{k_n\}$, a K-ary Pseudo-Random Sequence PRS with e.g. K=4 or 8, in the key stream generator 18 is described below. For the present case of OFDM, the preferred choice of $\{k_n\}$ has the form $$k_n = e^{j\phi_n},$$

where $\{\phi n\}$ is a K-ary pseudo-random sequence with $0 \leq \phi_n \leq 2\pi$. The OFDM time-discrete signal is then generated as a superposition of the N modulated sub-carriers, i.e.

$$x_k = \sum_{n=0}^{N-1} v_n \cdot e^{j2\pi \frac{nk}{N}}$$

which is most efficiently calculated by an Inverse Fast Fourier Transform in IFFT 14. Adding a so-called cyclic prefix in a prefix adder 15 reduces inter-subcarrier interference at the receiver. Finally, a digital-to-analogue conversion and possibly a mixing or frequency-translation to the actual carrier frequency takes place in a mixer and digital to analog (D/A) converter 16, resulting in the transmitted signal x(t).

As mentioned above, encryption is provided by the K-ary key stream sequence $\{k_n\}$ or $\{\phi_n\}$. Key streams are pseudo-random sequences which are uniquely determined by an encryption key, they must be of large length (period) and unpredictable (given an extract of the sequence) for anyone not knowing the encryption key. Generation of binary key streams for binary stream ciphers is a well-known subject.

For the present application, a K-ary key stream sequence $\{\phi_n\}$ can simply be obtained by using $\log_2 K$ successive output bits of a binary key stream generator. These bits address a table with K entries containing the mapping to values of $\phi_n$, or to $\text{Re}(k_n)=\cos(\phi_n)$ and $\text{Im}(k_n)=\sin(\phi_n)$. With reasonable choices of the table entries, cryptographically good binary sequences then yield cryptographically good K-ary $\{\phi_n\}$. Obviously, the size of the encryption key determining the key stream $\{\phi_n\}$ must be large to prevent brute force attacks and preferably comprise 128 bits or more. Also, the period of the key stream must cover a large number of OFDM symbols, wherein for each OFDM symbol with N sub-carriers or N QAM symbols $z_n$, N·$\log_2(K)$ bits of the binary key stream are consumed. The index n in $\{k_n\}$ must therefore count over many such OFDM symbols.

The optimum choice of the K levels of $\phi_n$ (assigned equidistantly between 0 and $2\pi$), depends on $m_n$, or more precisely on the constellation points of the $2^m$-QAM symbols $z_n$. For example, the regular $2^2=4$ point constellation would be congruently rotated with K=$2^2$=4 levels of $\phi_n$, (namely 0, $\pi/2$, $\pi$, $3\pi/2$) hence K=4 should be sufficient to encrypt these QAM symbols $z_n$. On the other hand, a higher value of K may be preferable in order to obstruct any open loop carrier synchronization attempted by an eavesdropper.

Figure 2:
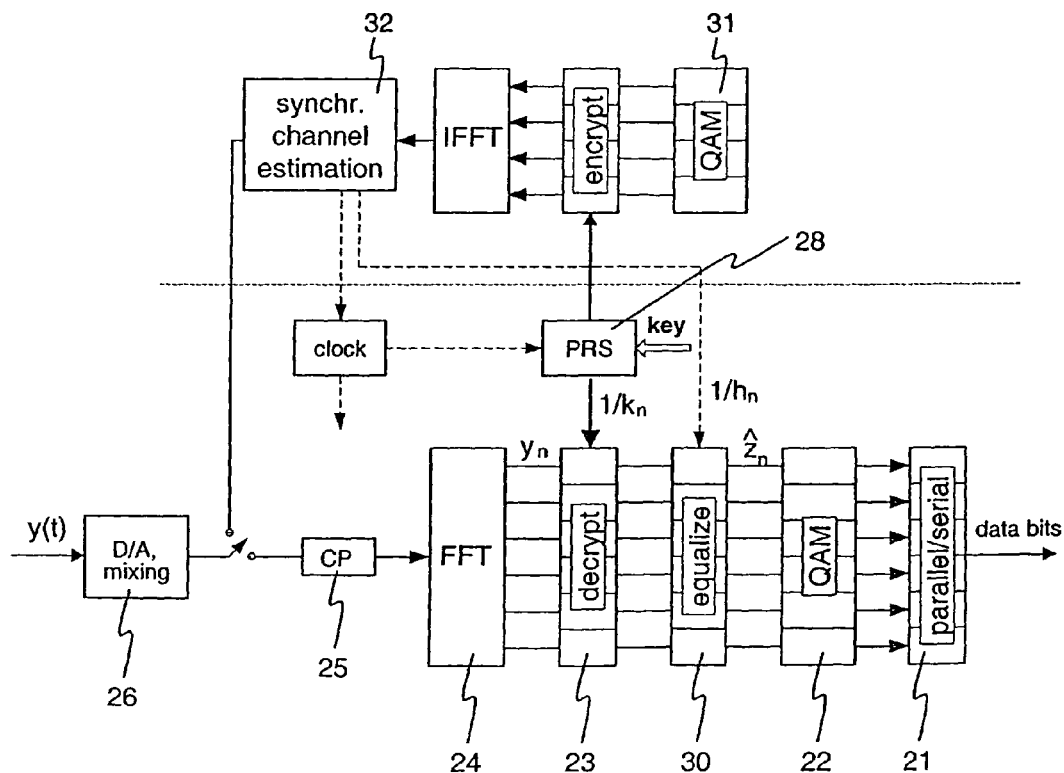
FIG. 2 schematically shows a receiver block diagram.

FIG. 2 shows the block diagram of a receiver which in principle simply inverts the steps performed by the transmitter. The received analog signal y(t) is down-mixed and digitized in the down-mixer and analog to digital (A/D) converter 26 and passes through the cyclic prefix remover 25. A Fast Fourier Transformer 24 calculates the symbols $y_n$ (n=0 . . N−1) which are then decrypted in decryptor 23 with the aid of the key stream sequence $\{k_n\}$ provided by the key stream generator 28. Finally, demapping and serializing is performed in QAM de-mapper 22 and symbol serialiser 21.

A channel transfer function $h_n$ represents a possible distortion of the received signal $y_n$ at the n-th sub-carrier frequency by the propagation characteristics of the channel. Thus a receiver estimate $\hat{v}_n$ of the cipher text sequence is approximated by $$y_n = h_n \cdot \hat{v}_n,$$

and the distortion is corrected for in equalizer 30, i.e. the combined operation $$\hat{z}_n = k_n^{-1} \cdot \frac{y_n}{h_n} = e^{-j\varphi_n} \frac{y_n}{h_n}$$

equalizes and decrypts the QAM symbol $\hat{z}_n$ which can then be fed to the QAM de-mapper 22 to finally recover the transmitted data bits. This requires that the receiver knows the encryption/decryption key and also the precise clocking information.

Synchronization to obtain this clock information and estimation of the channel transfer function $h_n$ are the two crucial ancillary tasks of the receiver. As depicted in FIG. 2, these tasks are performed by a synchronizer/channel estimator 32. The latter correlates the received signal against known replicas of "training" OFDM-symbols 31 which the transmitter periodically inserts into the sequence of "data" OFDM-symbols. According to a preferred variant of the present invention, it is proposed to also encrypt the training OFDM symbols 31 used to support synchronization and channel estimation, i.e.

any training symbol inserted by the transmitter shall be encrypted by an alteration based on $k_n$ in the same way as normal data-carrying symbols. The receiver having knowledge of both the key stream $\{k_n\}$ and the unencrypted training OFDM symbols 31 is able to generate the encrypted time-varying training signals and use these for synchronization and channel estimation in the usual manner. However, an eavesdropper without knowledge of the encryption key is not even able to synchronize to the intercepted signal. This provides an additional strong level of protection. Preferably, it is ensured that the key stream $\{k_n\}$ encrypting known plaintext such as, in particular, the training symbols 31, will not be re-used to encrypt other data.

In summary, the present invention is concerned with a method to encrypt OFDM modulation, by multiplying its underlying QAM symbols by a complex-valued generalized key stream sequence. Performing encryption on the physical layer ensures that all services and applications running over the OFDM modem will be protected against eavesdropping. It is also proposed to include in the encryption any training symbols used for synchronization and channel estimation. Only the legitimate receiver knowing the encryption key is hence able to synchronize and correctly demodulate the received signal, whereas attackers will not even be able to acquire the encrypted signal.

List of designatioins
10 data source
11 OFDM vectorizer
12 QAM mapper
13 encryptor
14 inverse fast fourier transformer IFFT
15 prefix adder
16 mixer and digital to analog (D/A) converter
18 key stream generator
21 symbol serialiser
22 QAM de-mapper
23 decryptor
24 fast fourier transformer FFT
25 cyclic prefix remover
26 downmixer and analog to digital (A/D) converter
28 key stream generator
31 "training" OFDM-symbols
32 synchronizer/channel estimator

The invention claimed is:

1. A method of encrypting data on a physical layer of a data transmission system that includes a modem, comprising the steps of
providing, through a key stream generator of the modem, a K-ary key stream sequence $\{k_n\}$,
mapping, on the physical layer of the data transmission system and in a QAM mapper of the modem, each of a sequence of data blocks on a QAM symbol $Z_n$,
altering, in an encryptor of the modem, each of the QAM symbols $z_n$ according to an element $k_n$ of the key stream sequence $\{k_n\}$, and creating encrypted symbols $v_n$ on the physical layer of the data transmission system,
wherein the encrypted symbols $v_n$ are assigned to $N \geq 2$ distinct sub-carriers of an Orthogonal Frequency Division Multiplex (OFDM) transmission scheme.

2. The method according to claim 1, wherein each element $k_n$ of the key stream sequence $\{k_n\}$ is chosen at random from K distinct values.

3. The method according to claim 2, wherein the QAM symbols $z_n$ are multiplied with the elements $k_n$ of the key stream sequence $\{k_n\}$.

4. The method according to claim 3, wherein the elements $k_n$ are of the form $k_n = e^{j\Phi n}$.

5. The method according to claim 4, wherein the QAM symbols $z_n$ form a set of $2^m$ distinct constellation points, characterized in that K=4 and $\emptyset_n$ is a multiple of $\pi/2$.

6. The method according to claim 2, wherein K equals the number of distinct constellation points, and wherein the QAM symbols $z_n$ are permuted among themselves.

7. The method according to claim 2, wherein training OFDM symbols are periodically inserted into the sequence of data blocks, encrypted and transmitted by a transmitter.

8. A method of decrypting data encrypted according to claim 7, wherein the training symbols are encrypted by a receiver and compared to received transmitted encrypted training symbols by a synchronizer/channel estimator, and wherein a channel transfer function $h_n$ or synchronization information is deduced therefrom.

9. A modem for encrypting data on a physical layer of a data transmission system the modem comprising:
a key stream generator for providing a K-ary key stream sequence $\{k_n\}$,
a QAM mapper for mapping, on the physical layer of the data transmission system, each of a sequence of data blocks on a QAM symbol $Z_n$,
an encryptor for altering each of the QAM symbols $z_n$ according to an element $k_n$ of the key stream sequence $\{k_n\}$, and for creating encrypted symbols $v_n$ on the physical layer of the data transmission system, wherein the modem further comprises an Inverse Fast Fourier Transformer for superposing the encrypted symbols $v_n$ according to an Orthogonal Frequency Division Multiplex (OFDM) transmission scheme.

10. The modem for decrypting data encrypted on the physical layer of a data transmission system by a method according to claim 8, comprising a synchronizer/channel estimator for comparing received transmitted encrypted training symbols with encrypted training symbols and deducing a channel transfer function $h_n$ or synchronization information therefrom.

11. A method of encrypting Orthogonal Frequency Division Multiplex (OFDM) data transmission systems, comprising the steps of:
providing, at a transmitter and a receiver, a K-ary key stream sequence $\{k_n\}$ as well as training OFDM symbols $z_n$,
altering, at the transmitter and the receiver, each of the training OFDM symbols $z_n$ according to an element $k_n$ of the key stream sequence $\{k_n\}$, and creating encrypted training OFDM symbols $v_n$ on a physical layer of the data transmission system,
assigning, at the transmitter, the encrypted training OFDM symbols $v_n$ to $N \geq 2$ distinct sub-carriers of an OFDM transmission scheme, and transmitting,
comparing, by a synchronizer/channel estimator, encrypted training OFDM symbols $v_n$ created at the receiver to received transmitted encrypted training OFDM symbols, and
deducing there from a channel transfer function $h_n$ or synchronization information.

* * * * *